(No Model.)
G. W. GILLETTE.
LOCK OR WASHER FOR NUTS.
No. 544,507. Patented Aug. 13, 1895.
FIG. 1.
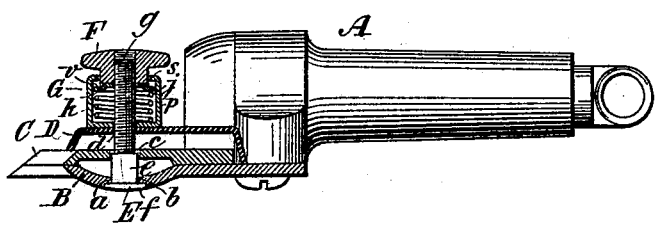
FIG. 3.
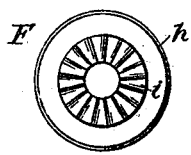
FIG. 7.
FIG. 4.
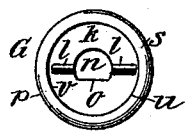
FIG. 2.
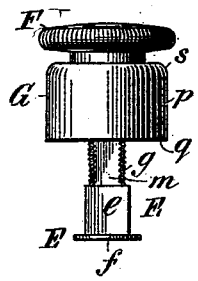
FIG. 8.
FIG. 5.
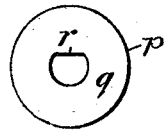
FIG. 6.
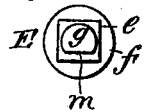
FIG. 9.
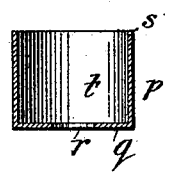
WITNESSES:
F. El White
Thomas F. Wallace
INVENTOR:
George W. Gillette,
By his Attorneys,
Arthur E. Fraser & Co.

UNITED STATES PATENT OFFICE.

GEORGE W. GILLETTE, OF NEW YORK, N. Y.

LOCK OR WASHER FOR NUTS.

SPECIFICATION forming part of Letters Patent No. 544,507, dated August 13, 1895.

Application filed December 8, 1894. Serial No. 531,190. (No model.)

*To all whom it may concern:*

Be it known that I, GEORGE W. GILLETTE, a citizen of the United States, residing in the city, county, and State of New York, have invented certain new and useful Improvements in Locks or Washers for Nuts, of which the following is a specification.

This invention relates to locks or washers for nuts or other analogous rotary pieces, and is designed to provide an improved compression or tension washer between the nut and the object against which its compression is exerted which shall prevent accidental unscrewing of the nut in use, permit its ready adjustment, and prevent access of foreign matter or dirt between the nut and the object against which it screws. Such a nut lock and washer is especially adapted for use with articles such as hair-clippers, wherein a bolt is used to clamp the tension-plate against a reciprocating knife, and thereby hold the latter against a stationary comb. It is customary in such structures to provide a nut on the bolt and interpose a spring between the nut and the tension-plate to give an elastic pressure.

In carrying out the preferred form of my improvements I provide, in connection with a non-rotative bolt and a nut having serrations or other projections on its inner face, an inclosing tubular casing surrounding the bolt, an elastic material within the casing, and a non-rotative washer between such material and the nut and having projections or shoulders engaging the projections or shoulders of the nut and preventing rotation of the latter, as will be hereinafter described in connection with the accompanying drawings, in which—

Figure 1 is a side elevation of a hair-clipper, partly in section, through the axis of its adjusting-nut. Fig. 2 is a side elevation of the bolt, nut, and lock removed and on a larger scale. Fig. 3 is a bottom plan view of the nut. Fig. 4 is a top plan view of the lock. Fig. 5 is a bottom view thereof. Fig. 6 is a plan view of the bolt. Fig. 7 is a side elevation of the nut. Fig. 8 is an edge view of the washer-disk, and Fig. 9 is an axial section of the casing in its form before the other parts of the lock are applied.

Referring to the drawings, let A indicate a hair-clipper; B, the comb thereof; C, the cutter thereof; D, the tension-plate; E, the bolt; F, the nut, and G my improved lock for the latter.

The clipper shown has a squared bolt-hole $a$ and a round-head socket $b$ in its comb B, and an elongated rectangular slot $c$ in its plate C and a coinciding round hole $d$ in the tension-plate D, as usual. The bolt E, as heretofore, has a squared head $e$, fitting the hole $a$ and slot $c$, a round head $f$, entering the socket $b$, and a screw-threaded shank $g$, rising through the hole $d$ and projecting above the tension-plate.

The nut F has a knurled portion $h$ and a reduced cylindrical shank having projecting shoulders, faces, or like provisions $i$ on its lower or inner face, as usual.

As thus far described the parts are of known construction, and in operation are employed, in conjunction with a spring, between the nut and plate D, against which the nut screws to increase the tension. The spring is usually fixed against rotation and has faces engaging the faces $i\ i$ of the nut to resist its rotation.

My invention provides an improved device between the nut and plate for transmitting the adjustment of the nut to the plate and preventing the rotation of the nut. In its preferred form this device is constructed as shown in the drawings, wherein a spiral spring, or other elastic medium $j$, is placed between the nut and the object against which it acts, and a non-rotative washer $k$, having shoulders, projections, or equivalent provisions $l$, is placed between the nut and the spring and moves longitudinally with the former, while its shoulders $l$ engage the like shoulders $i$ thereof to prevent accidental rotation of the nut under ordinary conditions. The spring may bear in any suitable manner against any suitable part of the plate D, and the washer $k$ may be kept from rotation in any desired way. I prefer for the latter purpose to construct the bolt E with a face or flat $m$ traversing one side of its screw-threaded end $g$, and the washer with a substantially cylindrical hole $n$ fitting over the end of the bolt, and a face or shoulder $o$ corresponding with and engaging the face or flat $m$ of the bolt to prevent relative rotation of the washer and bolt. The spring may thus be simply interposed between the washer and the object or plate D without the necessity of any special provision for preventing its displacement or rotation beneath the washer, since as the latter is maintained in proper position under the nut and prevented from rotation by the bolt it is only necessary for the spring to supply sufficient expansive force to keep the faces of the washer in engagement with the faces of the nut, in order that the washer shall serve as a lock, which force, of course, is always sufficient when the spring is compressed by the nut to give the requisite tension.

Another feature of my invention comprises a protecting and concealing casing for the spring or other material $j$, which serves to exclude foreign matter from the spring and guard and shield the latter and the washer in use. This casing is preferably constructed as shown in the drawings, where it is lettered $p$, and consists of a tubular shell, embracing the spring or other elastic material, the washer, and the shank of the nut, and interposed between the nut and the plate or other object against which it is opposed. Preferably the casing $p$ consists of a cup-shaped metallic piece having a flat bottom $q$ traversed by a concentric hole fitting over the end $g$ of the bolt, and having a face or flat $r$ engaging the like face $m$ thereof when it is desired that the casing shall be non-rotative, and at its other end the casing preferably has a flange or shoulder $s$ projecting inwardly toward the nut. Within the casing is a chamber $t$ holding the spring or other material and the washer. These parts are preferably inserted in the chamber and then secured in position by bending or inturning the flange $s$ until it sufficiently overhangs the washer to prevent its escape. Then the aperture, through the flange $s$, constitutes a nut-hole $u$, through which the inner end of the nut passes and which preferably snugly embraces the shank of the nut, thereby preventing the passage around this shank of any hair or other particles which might clog the spring. As the nut is adjusted its shank moves in or out through the hole $u$, forcing the washer $k$ downwardly against the spring and the latter downwardly against the bottom $q$ of the casing and the latter against the plate or object D on which it bears. The spring has preferably a loose fit in the casing and the washer $k$ a snug fit therein, so that any dirt above the washer will be prevented from passing below it to the spring. The faces $l$ of the washer are preferably discontinued near its outer edge, where it has a flat rim $v$, which engages the inner face of the flange $s$ when the nut is screwed out of the casing, so that the washer is stopped by this flange and makes a close joint therewith.

In operation the bolt E is applied to the clipper or other device in the usual manner. The part G is then passed over the head of the bolt and against the object to be held in position, and the nut F is then screwed on the bolt until the proper adjustment is attained. Thereafter it may be adjusted toward or from the object with the exercise of sufficient force to overcome the resistance of the engaging-faces of the nut and washer under the tension of the spring. The engagement between the nut and washer prevents any accidental loosening of the nut, so that adjustment can be maintained independently of the vibration of the article with which my improvement is employed. The casing not only keeps the spring free from dirt or hair which otherwise might reduce the elasticity of the spring by filling the spaces between the wire, but it also protects the spring from injury or displacement in use.

It will be seen that my invention provides an improved nut lock or washer which can be variously availed of, and which is simple and cheap in construction and effective and convenient in operation, and it will be understood that the invention is not limited to the exact details of construction, arrangement, or combination of the parts shown, but that it may be modified in any of these respects, as circumstances or the judgment of those skilled in the art may dictate, without departing from the spirit of the invention.

What I claim is—

1. In nut locks and like devices, a non-rotative bolt, and a nut screwing thereon and having a projecting cylindrical shank on its inner side, in combination with a cup-shaped casing surrounding said bolt, having a wall at its inner end, a hollow body, and an inwardly projecting flange at its outer end surrounding the shank of said nut, and a spring inclosed in the hollow body of said casing and acting against the shank of said nut, substantially as and for the purpose set forth.

2. In nut locks and like devices, a non-rotative bolt, and a nut screwing thereon and having a cylindrical shank on its inner side, and projecting faces at the inner end of said shank in combination with a non-rotative washer having reciprocal faces engaging those of the nut, an elastic material forcing said washer toward said nut, and a tubular casing inclosing said material and washer, and the shank of said nut and having an internal flange surrounding the said shank at the outer side of said washer, substantially as and for the purpose set forth.

3. In nut locks and like devices, a bolt E having a face $m$, and a nut F screwing on said bolt and having projecting faces $i$ on its inner side, in combination with a washer $k$ having faces engaging those of the nut, a hole $n$ embracing the bolt, and a face $o$ engaging the face $m$ thereof, a spring forcing said washer toward said nut, and a casing inclosing said spring, substantially as and for the purpose set forth.

4. In nut locks and like devices, a bolt E having a face $m$, in combination with a nut screwing on said bolt and having projecting faces $i$ on its inner side, a spring acting against the faces of said nut, and a casing $p$ inclosing said spring having a central hole fitting over said bolt, and a face $r$ engaging the face $m$ thereof and preventing rotation of the casing, said casing having a flange $s$ surrounding the shank of the nut, substantially as and for the purpose set forth.

In witness whereof I have hereunto signed my name in the presence of two subscribing witnesses.

GEORGE W. GILLETTE.

Witnesses:
GEORGE H. FRASER,
THOMAS F. WALLACE.